United States Patent [19]

Kashket

[11] Patent Number: 4,906,480
[45] Date of Patent: Mar. 6, 1990

[54] SWEETNESS AND FLAVOR ENHANCED COMPOSITIONS AND METHOD OF PREPARING SUCH COMPOSITIONS

[75] Inventor: Shelby Kashket, Chestnut Hill

[73] Assignee: Forsyth Dental Infirmary for Children, Boston, Mass.

[21] Appl. No.: 178,509

[22] Filed: Apr. 7, 1988

[51] Int. Cl.[4] .................. A23G 3/30; A23L 1/236; A23L 1/226
[52] U.S. Cl. ................................. 426/3; 426/548; 426/590; 426/534; 426/804; 424/489; 424/440; 424/441; 424/464
[58] Field of Search .................. 426/3, 804, 536, 534, 426/590, 548; 424/489, 440, 441, 464

[56] References Cited

U.S. PATENT DOCUMENTS

| 4,025,535 | 5/1977 | Crosby et al. | 426/548 |
| 4,241,097 | 12/1980 | Sprecker et al. | 426/536 |
| 4,479,972 | 10/1984 | Soukup et al. | 426/536 |
| 4,634,593 | 1/1987 | Stroz | 426/5 |

OTHER PUBLICATIONS

Bartoshuk et al., Science, "Sweet Taste of Water Induced by Artichoke", 178:988990, 1972.
Rosen et al., J. Dent. Res., "Anticariogenic Effects of Tea in Rats", 63 (5), 658–660, May 1984.

Primary Examiner—Jeanette Hunter
Attorney, Agent, or Firm—Richard P. Crowley

[57] ABSTRACT

A low concentration of polyphenols, particularly flavonoid compounds, such as flavonols, and more particularly catechin compounds, employed as additives to compositions containing sweeteners and/or flavoring agents, or both, significantly enhanced the sweetness and flavor and especially, extended the sweetness and flavor time. A composition, such as chewing gum, which comprises a sweetening or flavoring agent, or both, and a sweetness or flavor extending or enhancing amount of a flavonoid compound, such as a catechin compound. A method of extending and enhancing the flavor and sweetness of a composition, such as chewing gum, food or beverage, which method comprises incorporating onto or into the composition a flavor or sweetness extending or enhancing amount of a flavonoid compound, such as a catechin compound.

20 Claims, No Drawings

SWEETNESS AND FLAVOR ENHANCED COMPOSITIONS AND METHOD OF PREPARING SUCH COMPOSITIONS

BACKGROUND OF THE INVENTION

It is desirable in natural and processed foods and beverages and pharmaceutical compositions containing flavoring agents and/or sweetening agents, or both, to both enhance the sweetness or flavoring taste and also to extend the sweetness of flavoring taste when such compositions are consumed in the oral cavity. Enhancement of flavors or sweeteners and also extension of the flavor or sweetness taste in chewing gum compositions and foods are particularly difficult but desirable, since the generally soluble flavoring and sweetening agents are masticated out of the insoluble gum base and swallowed quickly in use.

There are a number of techniques for enhancing flavor and sweetness and extending the flavor and sweetness, such as by the controlled release of the flavoring agents and sweetening agents or through processing steps or by other techniques (see for example U.S. Pat. No. 4,634,593, issued Jan. 6, 1987 hereby incorporated by reference which discloses a composition and method of providing the controlled release of sweeteners in a chewing gum composition). In particular, it would be desirable to provide for a simple sweetness and flavor extending additive to be coated on or incorporated into edible compositions to increase the intensity and duration of the sweet taste and flavor of foods, beverages and chewing gum compositions.

It is known that artichoke extracts have been reported to make water taste sweet, and the active factors in the artichoke extracts have been reported to be salts of chlorogenic acid and cynarin (see Bartoshuk, Lee and Scarpellino, Science 178: 988–990, 1972). Flavonoid compounds have been disclosed as possible preventative agents for dental caries (see Rosen et al, 1984).

SUMMARY OF THE INVENTION

The present invention relates to flavoring and sweetness enhancing and extending additives and to compositions, particularly chewing gum, as well as food and beverages employing said additives, and to the method of using said additives for preparing edible compositions.

It has been discovered that a low concentration of polyphenols, particularly flavonoid compounds, such as flavanol, and more particularly catechin compounds, employed as additives to compositions containing sweeteners and/or flavoring agents, or both, significantly enhanced the sweetness and flavor and especially, extended the sweetness and flavor time. In particular, it has been discovered that low flavor extending and enhancing amounts of a flavonoid compound, particularly from the class of catechin compounds, were particularly useful in extending and enhancing the flavor and sweetness of chewing gum compositions. The employment of the flavonoid compounds in such compositions could permit lower levels of the sweetener or flavoring agents to be used. For example, lower levels of sucrose and certain non-nutritive sugar substitutes would be needed to provide adequate food and beverage quality. Flavanol compounds, and particularly catechin, have not been used as sweetness and flavor modifying additives, except unintentionally, as they exist as constituents of natural and processed foods and beverages.

Catechin is a polyphenol and is a flavanol, which in turn is one of the class of compounds known as flavonoids. Catechin is a relatively major constituent of tea and other beverages and so is consumed daily in significant amounts worldwide as well as in cocoa, coffee, fruits and other edible plant products. It has been found that tea infusions intensity the taste of sucrose, and it has been found that solutions of catechin, when used as a rinse, makes subsequent drinks of water taste sweeter. In particular, it has been discovered that coating or incorporating a flavanol compound, such as catechin, and for example, a gallocatechin, an epicatechin or an epigallocatechin, or combinations thereof, in or onto chewing gum enhances both the flavor and the sweetness and especially, extends the flavor and the sweetness of the chewing gum. The discovered flavanol compounds employed as flavor and sweetness enhancers and extenders are not substitute sweeteners or flavoring agents. However, without wishing to be bound by any particular theory of operation of the invention, such compounds appear to modify taste and flavor receptors in the mouth to make them more sensitive to sweetness, such as sucrose, sorbitol, aspartame and other sweeteners as well as to various flavoring agents. For example, dilute solutions of catechin are tasteless and slightly astringent and are not in themselves sweeteners or flavoring agents.

The particular amount of the flavor and sweetness extenders to be employed in the practice of the invention may vary depending upon the degree of flavor or sweetness enhancement and extension desired and the particular sweeteners and flavors involved in the edible composition. However, very low amounts of the flavanol compounds may be employed, such as, for example, in the range of 0.001% to 1%, and more particularly, 0.01% to 0.1% by weight of the composition. The flavanol compounds may be used alone or in combination with other sweetness and flavor enhancers and extenders or with processing techniques employed to enhance sweetness or flavor or to extend sweetness or flavor is now known or to be known.

The flavanol compounds may be employed with a wide variety of compositions and may for example be employed in solution or in powder form, alone or with bulking and inert agents, on direct application to compositions, either as a powder or a liquid. The flavanol compounds may be used in a wide variety of natural and processed food and beverage compositions as well as pharmaceutical compositions containing flavoring agents or sweeteners or typically a combination of both, such as, for example, but not limited to: chewing gum compositions; baked goods; confectionery compositions; beverages; toothpaste; mouthwash; lozenges; syrups; candy and other compositions to include pharmaceutical and other drug compositions containing sweetness and flavoring agents.

The composition may contain a sweetener or a flavoring agent, or both. For example, the composition may contain sweeteners such as glucose, sucrose, dextran, sorbitol, mannitol, fructose, corn syrup, solids, sugar, as well as saccharin and dipeptides like aspartame or combinations thereof. In addition, the compositions may contain carbohydrates and fat and bulking agents and minor amounts of coloring and texture modifiers, syrups, flavoring agents, softeners, stabilizers, antioxidants, dye and other additives commonly employed in edible food and pharmaceutical products. The flavoring agents may comprise any variety or combination of natural or synthetic flavoring agents, such as flavoring oils, particularly aldehydic oils, such as spearmint, peppermint and wintergreen oils and cinnamon.

When the composition to be enhanced in sweetness and flavor and extended in sweetness and flavor constitutes a chewing gum composition, then the flavonoid compound may be added or coated onto the chewing gum. Such chewing gum compositions commonly comprise a gum base, which is a solid or viscous liquid accepted by the U.S. F.D.A., and more particularly for example may be a styrene-butadiene-styrene rubber gum-type base or other natural and synthetic gum bases. Chewing gum compositions typically also optionally include one or more sweetening agents, a flavoring agent, a softener and a bulking agent. The preferred compound for use in chewing gum compositions comprises the flavanol compounds, but particularly catechin or other polyhydroxyphenol benzopyran-type compounds, such as dihydroxyphenol benzopyran and trihydroxyphenol benzopyran.

The sweetness and flavor enhancing and extending additives will be described for purposes of illustration only in connection with certain embodiments. However, it is recognized that those persons skilled in the art may make various changes, modifications, improvements and additions to the illustrated embodiments without departing from the spirit and scope of the invention.

DESCRIPTION OF THE EMBODIMENTS

It has been found that when catechin is applied and dried onto sticks of chewing gum, the chewing gum both tastes sweeter and the sweetness of the chewing gum lasts longer than untreated chewing gum upon chewing. Experiments were carried out in which a catechin-in-water solution of catechin was applied to and dried onto sticks of Wrigley spearmint gum (Gum A) and onto Wrigley Extra Chewing Gum (Gum B). The subject was given one-half of a stick of Gum A and Gum B onto which 0.1 milliliter of a 0.2% catechin solution had been applied and dried onto the gum surface. Control tests were carried out with untreated Gum A and Gum B.

TABLE

| Samples | Sweetness Rating (time in minutes) | | | | | |
|---|---|---|---|---|---|---|
| | Very Sweet | Sweet | Moderate Sweet | Little | Faint | Not Sweet |
| 1. Gum A Control | — | 0-1 | 2 | 4-6 | — | 10 |
| 2. Gum A & Catechin | 1-2 | 4 | 6 | — | 10 | — |
| 3. Gum B Control | — | — | 0-2 | 4 | — | 10 |
| 4. Gum B & Catechin | 0 | 2-4 | 6-8 | — | 10 | — |

As illustrated by the above table, it can be seen that the sweetness, measured subjectively, was higher at all times compared to one-half control stick of the untreated Gum A and Gum B. Further, it was found that the spearmint flavor and the sensation of coolness were enhanced and prolonged in the chewing gum treated with the catechin. The chewing gum, where it was discarded after ten minutes, and was followed by a rinse with 10 milliliters of water at 15 minutes, elicited a moderately sweet sensation after the use of the catechin-treated chewing gum. Gum A, the Wrigley Spearmint gum, is a sugar-containing gum, while Gum B was the sugar-free, aspartame-sorbitol-mannitol containing Wrigley Extra Chewing Gum.

What is claimed:

1. An edible or potable composition which comprises a sweetening agent and a sweetening or flavor enhancing and extending amount of a flavanol compound.

2. The composition of claim 1 wherein the flavanol compound comprises a catechin compound.

3. The composition of claim 1 wherein the flavanol compound is selected from the group consisting of catechin, gallocatechin, epicatechin and eipgallocatechin and combinations thereof.

4. The composition of claim 1 wherein the composition is a chewing gum.

5. The composition of claim 1 wherein the flavanol compound is present in an amount of from about 0.001% to 0.1% by weight of the composition.

6. The composition of claim 1 wherein the sweetening agent comprises aspartame, sucrose, glucose, fructose or other sugars, sugar alcohols and synthetic sweeteners.

7. The composition of claim 1 wherein the flavanol compound is coated onto the exterior of the composition.

8. The composition of claim 1 wherein the flavanol extends the sweetness time of the composition for a period of over five minutes from the approximate sweetness time period without the flavonoid compound.

9. The composition of claim 1 which includes a flavoring agent and wherein the flavanol composition is present in an amount to enhance the flavoring agent.

10. A chewing gum composition which comprises a gum base, a sweetening agent and a sweetening extending or flavor enhancing amount of a flavanol compound.

11. The composition of claim 10 which chewing gum composition includes a flavoring agent.

12. The chewing gum composition of claim 10 wherein the flavanol compound is present in an amount of from 0.001% to 0.1% by weight of the chewing gum.

13. The method of enhancing and extending the sweetness time of an edible or potable composition containing a sweetening agent, which method comprises adding to the edible or potable composition a sweetness extending or flavor enhancing amount of a flavanol compound.

14. The method of claim 13 wherein the flavanol compound is present in an amount from 0.001% to 0.1% by weight of the composition.

15. The method of claim 13 wherein the composition comprises a chewing gum composition, food or beverage.

16. The method of claim 13 wherein the composition includes a flavoring agent and the flavanol compound is present in a flavor extending and enhancing amount.

17. The composition produced by the method of claim 13.

18. The method of treating an edible or potable composition introduced into the oral cavity to extend or enhance the sweetness or flavor of the composition which method comprises contacting the composition with about 0.001% to 1.0% by weight of the composition of a catechin compound.

19. The method of claim 18 wherein the flavanol compound is selected from the group consisting of catechin, gallocatechin, epicatechin and epigallocatechin and combinations thereof.

20. The method of extending the sweetness time of an edible composition which composition contains in combination a sweetening agent and a sweetness time extending amount of a non-sweetener flavanol compound.

* * * * *